United States Patent [19]

Smith et al.

[11] Patent Number: 4,475,798
[45] Date of Patent: Oct. 9, 1984

[54] CAMERA FOR STEREOSCOPIC PHOTOGRAPHY

[75] Inventors: Edgar C. Smith, Long Island City; James B. Campbell, New York, both of N.Y.

[73] Assignee: The Three Dimensional Photography Corporation, Yonkers, N.Y.

[21] Appl. No.: 864,747

[22] Filed: Dec. 27, 1977

[51] Int. Cl.² ............... G03B 35/08; G03B 27/32; G03B 17/00

[52] U.S. Cl. .................. 354/114; 354/294; 355/77

[58] Field of Search ........... 354/286, 294, 110–125, 354/106, 202, 276; 355/77, 46

[56] References Cited

U.S. PATENT DOCUMENTS

| | | | |
|---|---|---|---|
| 1,674,540 | 6/1928 | Bagley | 354/106 |
| 1,892,683 | 1/1933 | Robertson | 354/123 X |
| 2,214,228 | 9/1940 | Eppensteiner | 354/118 |
| 2,269,183 | 1/1942 | Crumrine | 354/276 |
| 2,753,774 | 7/1956 | Norling | 354/115 |
| 2,791,950 | 5/1957 | Oppenheimer | 354/294 |
| 2,834,270 | 5/1958 | Williams | 354/115 |
| 3,401,594 | 9/1968 | Daugherty | 355/46 |
| 3,482,913 | 12/1969 | Glenn | 355/77 X |
| 3,563,637 | 2/1971 | Ferguson | 355/46 X |
| 3,656,850 | 4/1972 | Harman | 355/46 |
| 3,895,867 | 7/1975 | Lo et al. | 355/77 |
| 4,063,265 | 12/1977 | Lo et al. | 354/294 |

FOREIGN PATENT DOCUMENTS

| | | | |
|---|---|---|---|
| 508386 | 6/1939 | United Kingdom | 354/112 |
| 765394 | 1/1957 | United Kingdom | 354/114 |

OTHER PUBLICATIONS

Ritz Camera Centers, 1961 Photo Reference Guide, pp. 36 and 37.

*Primary Examiner*—Donald A. Griffin
*Attorney, Agent, or Firm*—Jay L. Chaskin

[57] ABSTRACT

A photographic camera for providing a plurality of film images in order to produce a stereogram. The camera has a plurality of objectives which are independently adjustable so that the optical axes of the lenses can be made substantially parallel in a first plane and substantially coplanar in a second plane orthogonal to the first plane. The objectives have substantially the same focal length and common shutter, aperture and focal control. The camera may include a film magazine having a film advance equal to the number of objectives.

30 Claims, 9 Drawing Figures

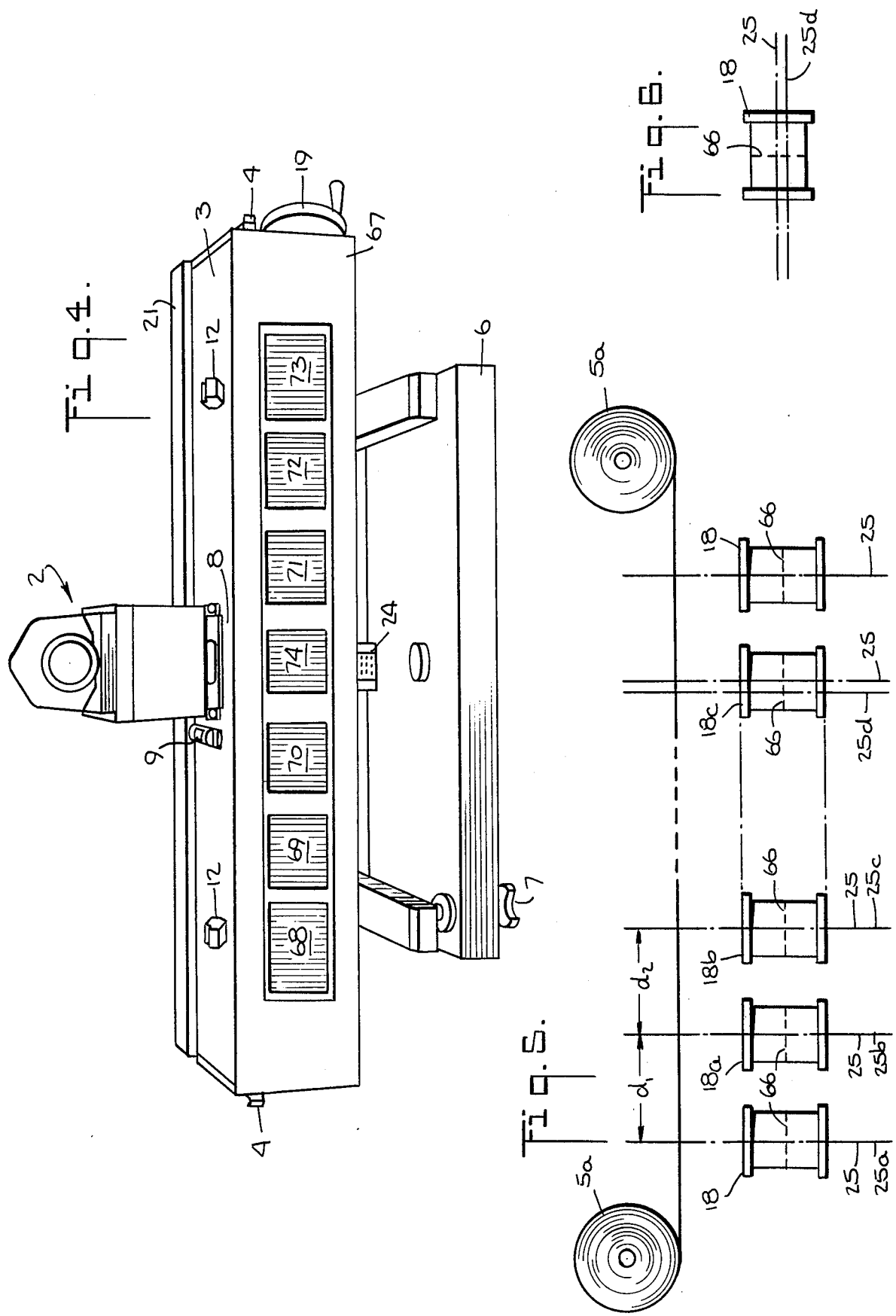

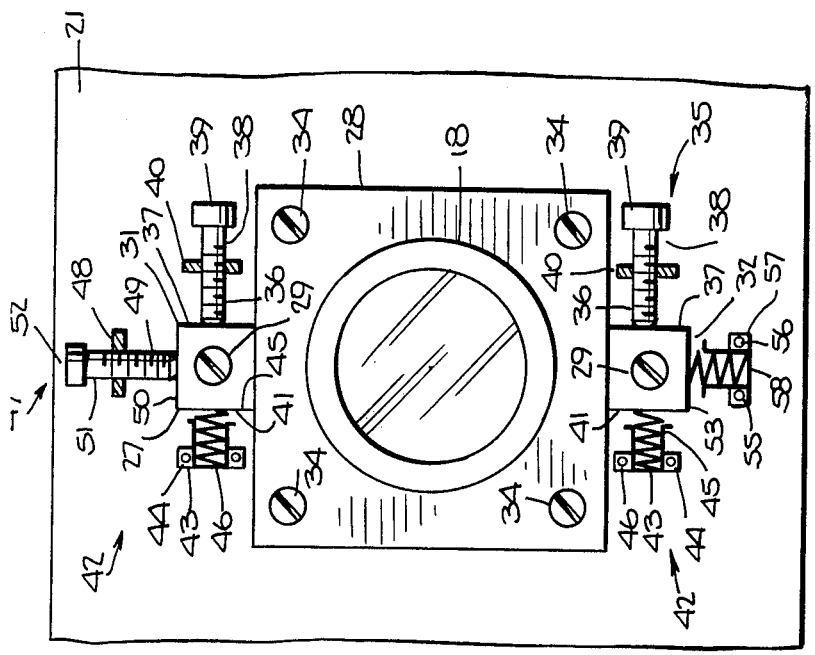

CAMERA FOR STEREOSCOPIC PHOTOGRAPHY

BACKGROUND OF THE INVENTION

This invention is directed to an apparatus for providing a photographic stereogram. More particularly this invention is directed to a multi-objective lens camera for providing a plurality of photographic images which can be used to form a stereogram.

A photographic stereogram may be prepared by several methods: (1) a photograph taken with a normal camera having a single objective and moving it or the object to successive viewpoints; or (2) a photograph taken with a camera having a single objective and an optical stereo attachment which enables two photographs of an object to be taken simultaneously from two viewpoints; or (3) a photograph of an object with a camera having two objectives whose separation is equal to the normal sterescopic base of approximately 65 mm. A combination of any of the foregoing methods may also be used. Each of the photographs is photographically broken up into a series of narrow strips representing alternatively the picture of the left and right stereogram.

In each of the above methods the single or multiple camera objectives are directed to an aim point. The aim point is the point of convergence of the lenses in a multi-objective lens camera or the center of arc of a single lens camera rotating around the subject or the center of the subject rotating around during the camera exposure. The aim point is a vertical line within the image that will be at the rear surface of a superimposed lenticular screen when the finished picture is viewed. The aim point is therefore established and fixed before or when the photosensitive material is exposed. After exposure the aim point cannot be changed or adjusted.

A particular problem arises when the photography is of small objects at short range with a single objective lens. Movement of the camera to a second position usually requires a rotation in order that the object to be photographed may remain within the field of view. However, this rotation leads to undesirable distortions of the images. This parallax difference can be avoided if the optical axis of the objective lens remains always parallel to its original position and, of course, normal to the plane of the photosensitive material. The objective must be moved parallel to the photosensitive material without rotation of the optical axis and in such a direction as to reduce the length of the baseline between the positions of the lenses. A normal single objective camera, however, is of rigid construction and the objective cannot be moved.

Although the methods described for a single-lens camera are quite simple, nevertheless considerable time is required for accurate setting up of the apparatus; and in carrying out the steps in making two exposures. In addition, moving the object instead of the camera is impractical with remote objects, buildings and other motionless subjects or where the background is discontinuous and non-uniform.

SUMMARY OF THE INVENTION

It is an object of the present invention to provide an apparatus for producing a plurality of photographic images for a stereogram.

It is a further object of the present invention to provide a photographic apparatus for a stereogram in which the aim point is not established when the photosensitive material is exposed.

It is a further object of the present invention to provide a multi-objective photographic apparatus wherein the optical axes of the objectives are adjustable.

It is still a further object of the present invention to provide a multi-objective photographic apparatus wherein the optical axes of each objective are independently adjustable.

In accordance with the invention, the camera comprises at least two or more and in the disclosed embodiment there are seven objective lenses having substantially the same focal length, the lenses being mounted in a common structure. The optical axes of each of the lenses are substantially parallel in a first plane and substantially coplanar in a second plane orthogonal to the first plane. The optical axes of any pair of adjacent pair of lenses are spaced substantially equidistant from each other and substantially equal to the distance between any other adjacent pair of lenses. Adjustment means for each lens comprising a spring biased screw permits the horizontal or vertical correction of any optical axis displacement from the parallel relationship in the first plane and coplanar relationship in the second plane. The camera may have a shutter for each lens which is actuated simultaneously and instantaneously as well as simultaneous aperture and focus control in a manner known per se. The rear of the camera includes a film plate located at the focal plane which has a plurality of openings corresponding to the number of objective lenses, the openings to the left and right of a reference line being progressively wider. The reference line may pass through the optical axis of a centrally located opening for a central lens. Attached to the rear of the camera and facing the film plate is a film magazine.

BRIEF DESCRIPTION OF THE DRAWINGS

While the specification concludes with claims which particularly point out and distinctly claim the subject matter regarded as the invention herein, it is believed that the invention will be better understood from the following description thereof taken in conjunction with the accompanying drawings, in which:

FIG. 4 is a rear view of the camera of FIG. 1 with the film magazine removed;

FIG. 5 is a schematic of the arrangement of the objective lenses of the camera of FIG. 1;

FIG. 6 is a schematic of one of the objective lenses of the camera of FIG. 1 showing a displaced optical axis;

FIGS. 7 and 8 are partial side and plan views of the optical axis adjustment means for the camera of FIG. 1; and FIG. 9 is a schematic plan view of the film plate at the rear of the camera of FIG. 1.

DESCRIPTION OF THE INVENTION

Figure 1:
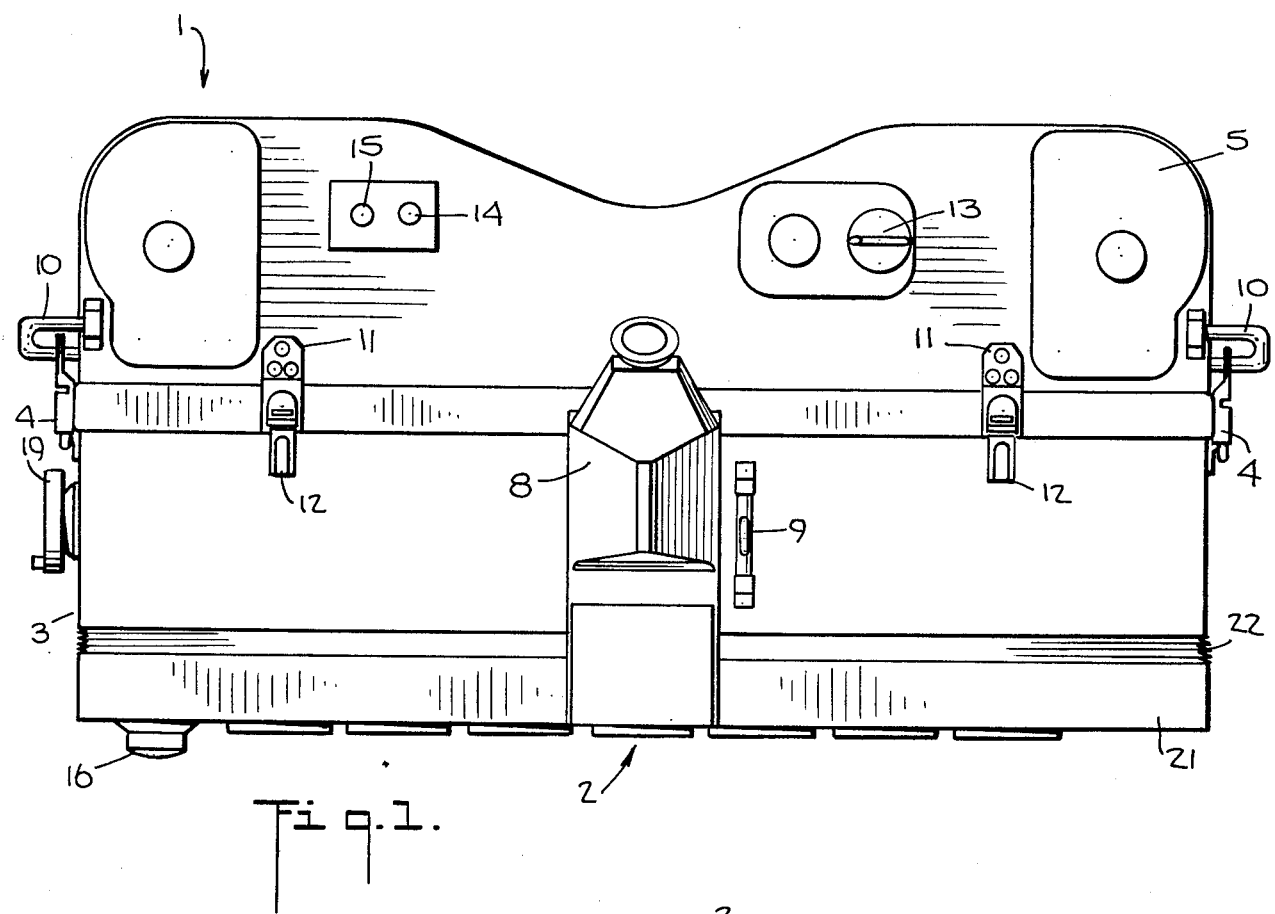
FIG. 1 is a top view of a camera in accordance with the present invention.
Figure 2:
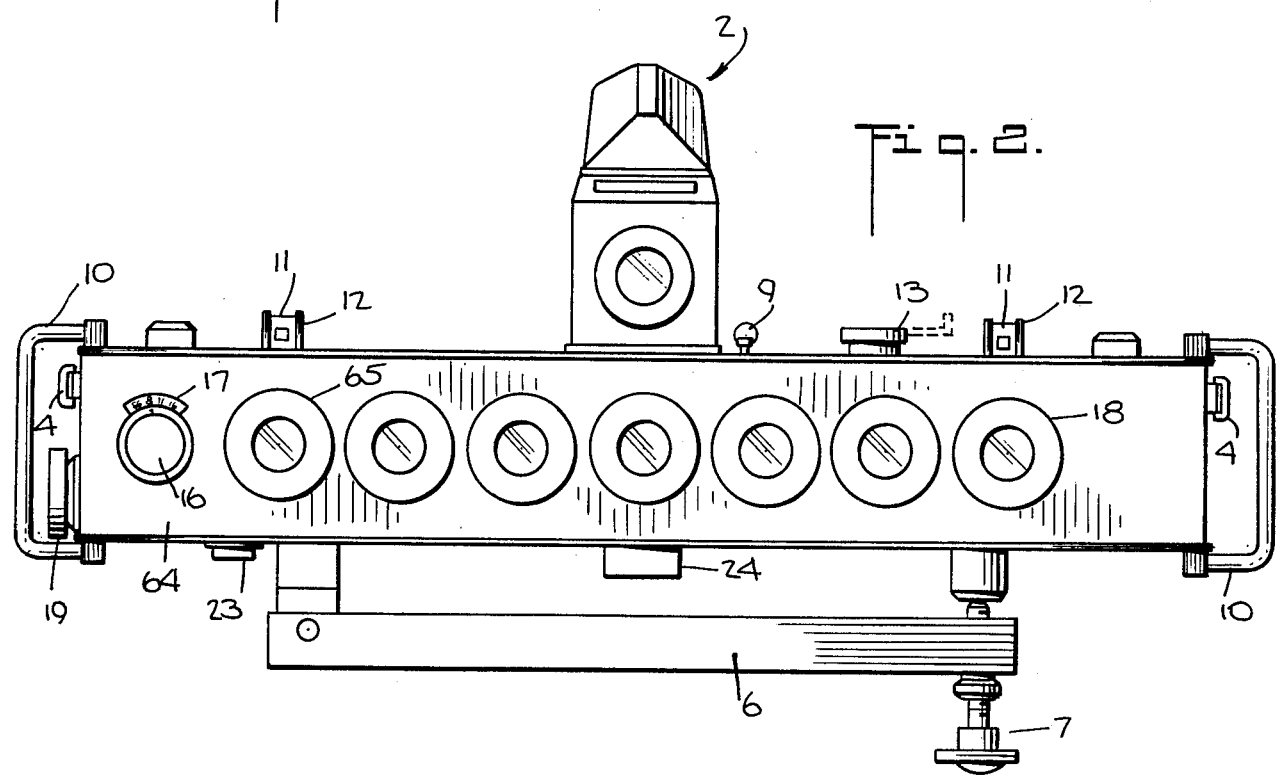
FIG. 2 is a front view of the camera of FIG. 1.
Figure 3:
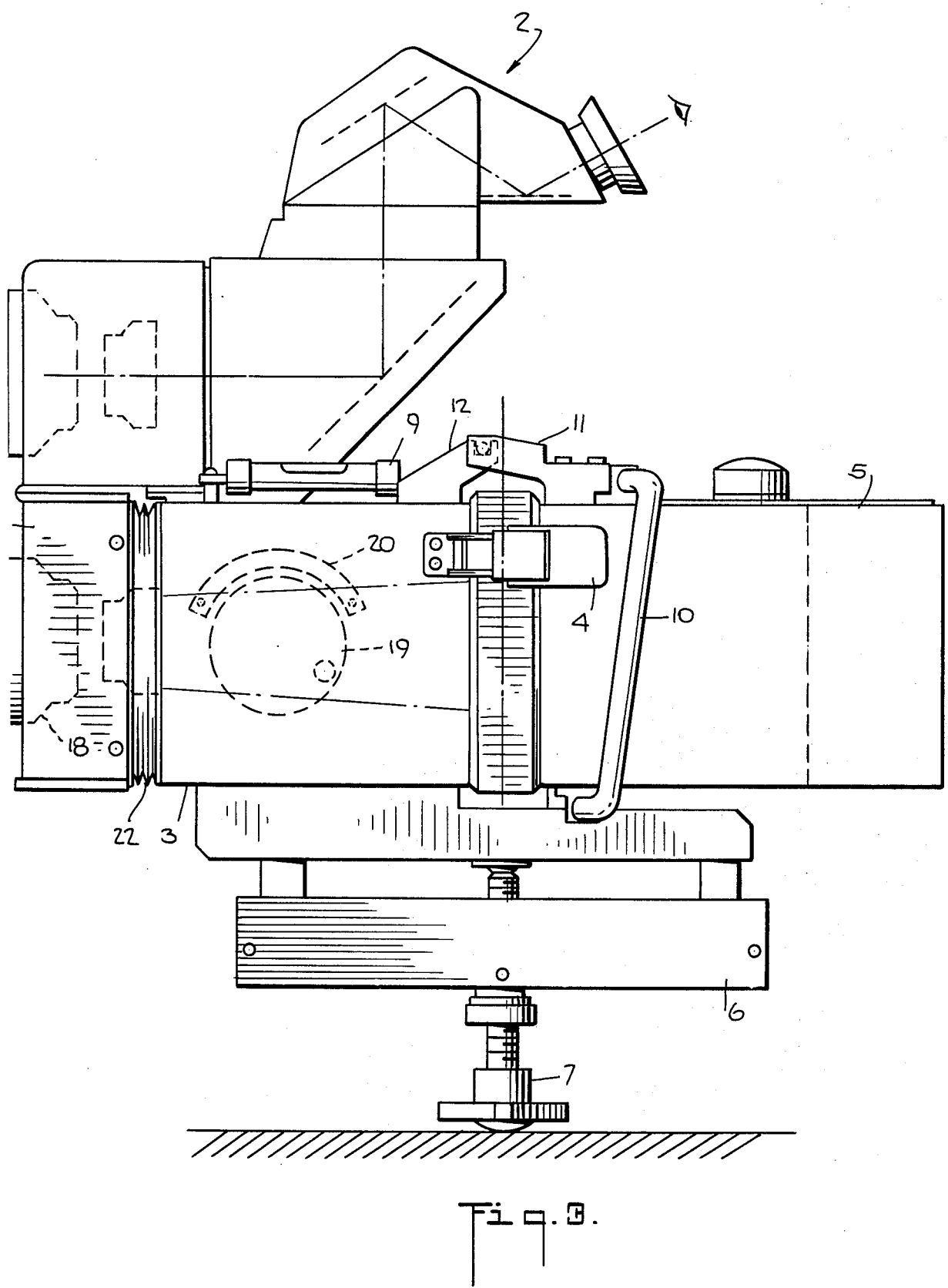
FIG. 3 is a side view of the camera of FIG. 1.

Referring to FIGS. 1 to 4 the camera 1 comprises a single lens reflex viewing means 2 mounted on a camera body 3. Attached to the camera body 3 by latches 4 is a film magazine 5. The camera 1 is mounted on a supporting plate 6 which forms a tripod mounting means. When mounted on a tripod or pedestal or stand or a similar support the camera can be leveled in two planes by adjustment 7 in cooperation with horizontal level 8 and vertical or pitch level 9. Horizontal and vertical levels 8 and 9, located on the camera body, are typically bubble-type levels. Extending from either side of the film magazine 5 are handles 10 for manually removing and carrying the magazine. In addition to latches 4 the magazine 5 is securely affixed to the camera body 3 by latch guides 11 on the magazine which engage corresponding guides 12 on the body 3. Disposed within the magazine 5 is a photosensitive film 5a preferably in a cassette form in a manner known in the art. The film advance equal to the number of objective lenses is by an external handle 13 disposed on the magazine. Handle 13 is shown in the stored position in FIG. 1 and extended in FIG. 2. A multi-digit counter 14, having reset knobs 15, indicates the number of frames remaining on the film during the photographic operation. Available externally of the camera body are controls necessary for the photographic operation. A common aperture or f-stop selection and control means 16 and 17 is available for the plurality of objective lenses 18. Knob 16 actuates simultaneously a common aperture control for the lenses 18 and the aperture selected is determined with the aid of scale 17. In addition a common focus selection and control means 19 and 20 is available for the plurality of lenses 18. Knob 19 actuates simultaneously a common focus control for the lenses 18. The focus can be adjusted with the aid of scale 20 or ground glass in viewing means 2. Focusing of lenses 18 is effected by the movement of all lenses simultaneously. The lenses 18 are affixed to a lens board 21 forming a common lens structure. Extending between the lens board 21 and the camera body 3 is a bellows 22 which permits the movement of the lenses for focusing. Located under the camera body 3 is an electrical connection means 23 for a control cable from a source of electrical power and a control means and an electrical interconnector 24 between the camera 1 and the film magazine 5. The control means (not shown) includes means for simultaneously and instantaneously actuating electrically a shutter means for each lens in order to accomplish the photographic operation. Shutter actuation is within the normal accepted range of shutter speeds of approximately one second to one-one thousandth of a second. The control means also includes means for selecting and controlling the exposure or speed operation of the shutter means, artificial light operation and a power supply.

It is an important feature of the present invention that the optical axes of the lenses 18 be adjustable in two planes orthogonal to each other. In a first plane the optical axis of each lens is substantially parallel. In the camera as described herein there are a plurality of lenses, at least two in number, and preferably there are seven lenses. The optical axes of any pair or adjacent pair of lenses are spaced substantially equidistant from each other and substantially equal to the distance between any other adjacent pair of lenses. In a second plane which is orthogonal to the first plane the optical axes of all the lenses are substantially coplanar. As shown in FIG. 5 each of the lenses 18 of the plurality of lenses has a respective optical axis 25 which is substantially parallel in a first plane to the optical axis of each of the other lenses. Further the spacing $d_1$ between the optical axes 25a and 25b of lens pair 18 and 18a is equal to the spacing $d_2$ between the optical axes 25b and 25c of lens pair 18a and 18b. A similar relationship exists for any other lens pair or adjacent pairs of lenses. As shown in FIG. 5, lens 18c is representatively shon as having an optical axis 25d which is horizontally displaced with respect to the desired optical axis 25. Such displacement is inconsistent with the equidistant spacing between adjacent lenses. In order to achieve such equidistant spacing it is preferred that the objective lens 18c be adjusted so as to cause the optical axis 25d to become coincident with optical axis 25.

As shown in FIG. 6 representative optical axis 25d is also not substantially coplanar in a second plane with optical axes 25. In FIG. 6 axis 25d is shown as being vertically displaced from the desired optical axis 25. Such displacement is inconsistent with the coplanar relationship. In order to achieve such coplanar relationship it is preferred that the objective lens 18c be adjusted so as to cause the optical axis 25d to become coincident with optical axis 25. FIGS. 7 and 8 show means for adjusting the optical axis 25d so as to bring about parallelism and equidistant spacing in a first plane and a coplanar relationship in a second plane orthogonal to the first plane. FIGS. 7 and 8 disclose an adjusting means for a representative lens it being understood that a similar means is present for all other lenses. Each of the lenses 18 are disposed in a common opening 26 preferably substantially concentric to the lens board 21 and an adjustment board 27 and a lens mount 28. The adjustment board 27 is secured to the lens board 21 by an adjustment locking screw 29 which passes through an opening 30 in tabs 31 and 32 of the adjustment board. The opening 30 is larger than the body of the screw 29 but not larger than the head 33 of the screw. The screw 29 is firmly engaged by the walls of the opening in the lens board. The lens mount 28 is securely fixed to the adjustment board 27 by lens mounting screws 34. The lens 18 has a tight fit in the portion of the opening 26 passing through the lens mount 28 and the adjustment board 27. A tight fit between the lens 18 and the portion of the opening 26 passing through the lens board 21 is not preferred.

The adjusting means for vertical and horizontal displacement in general comprises an adjustment screw which engages a surface of the tabs 31 and 32 while an opposing surface of the tabs 31 and 32 is urged against the screw by spring means. In FIG. 8 each one of a pair of horizontal adjustment screws 35 passes through a respective threaded guide which is securely affixed to the lens board 21. One end 36 of the screw 35 abuts and engages surface 37 of the tabs 31 and 32. Another end 38 of the screw 35 has a head 39 which can be engated manually or mechanically to advance or retract the screw from within the threaded guide 40. On an opposite surface 41 of the tabs 31 and 32 is a horizontal spring means 42 urging the surface 37 into abutting relationship with the screw end 36. Spring means 42 comprises a spring guide 43 mounted by screws 44 to the lens board 21 and a spring 45 located within the guide. Spring 45 is preferably in a slight compression between the bottom wall 46 of the guide 43 and the surface 41 of tabs 31 and 32.

Further as shown in FIG. 8, a vertical adjustment screw 47 passes through a threaded guide 48 which is securely affixed to the lens board 21. One end 49 of the screw 47 abuts and engages surface 50 of tab 31. Another end 51 of the screw 47 has a head 52 which can be engaged manually or mechanically to advance or retract the screw from within the threaded guide 48. On an opposing surface 53 of the tab 32 is a vertical spring means 54 urging the surface 50 into abutting relationship with the screw end 49. Spring means 54 comprises a spring guide 55 mounted by screws 56 to the lens board 21 and a spring 57 located within the guide 55. Spring 57 is preferably in a slight compression between the bottom wall 58 of the guide 55 and the surface 53 of tab 32.

In operation the adjustment locking screws 29 are loosened and the horizontal and vertical displacement screws 35 or 47 are turned. Rotating screws 35 or 47 causes the adjustment board 27 to move respectively horizontally or vertically and thereby the lens in order to align the displaced optical axis. The horizontal and vertical movement of the adjustment board is limited by the relative size of the opening 30, the extent of permissible compression or release of springs 45 and 57 and the size of head 33 of screw 29. After the displacement in the vertical or horizontal direction is corrected the screws 29 are tightened to prevent further misalignment.

As disclosed the optical axis is shown in the horizontal or vertical and parallel displacement from the desired optical axis. Misalignment may also occur from an angular deviation of the optical axis in a horizontal or vertical plane from the desired line of sight. Angular deviation is prevented by the structural configuration of the adjustment and lens boards and the camera body. In FIG. 7 mutually confronting and abutting surfaces 59 and 60 of the adjustment board 27 and lens board 21, respectively, are substantially flat and parallel throughout their contacting length and width for each lens. Surface 61 of the lens board 21 is similarly substantially flat and parallel throughout its length and width. Mutually confronting and abutting surfaces 62 and 63 of the adjustment board 27 and lens mount 28, respectively, are substantially flat and parallel throughout their contacting length and width for each lens. Upon assembly to the camera body 3 the lens board 21 is made substantially flat and parallel to the film focal plane thereby assuring minimal angular deviation of the optical axis in the horizontal or vertical planes. It is also within the skill of the art to provide positive adjustment means for angular deviation. For example, a spring means can surround the adjustment locking screws 29 but not be within the opening 30. Since the locking screws 29 and 180° apart adjustment for angular deviation in a vertical plane is possible. In a similar construction spring means can be provided 90° from the locking screws to adjust for angular deviation in a horizontal plane.

Access to the optical axis adjustment means can be provided by removal of closure plate 64 from the front of camera body 3. In order to permit removal of plate 64 it may also be necessary to temporarily remove aperture knob 16 and the respective covers 65 for the lenses 18.

Alignment of the optical axes in the vertical and horizontal planes can be further assisted by a suitably marked alignment ruler. For example a single ground glass plate having two surfaces parallel with a flatness equivalent to three fringes per inch is marked with inscribed or etched lines. Marked lines have a minimal thickness on the order of 0.001 inches so as not to interfere with the alignment. The marked lines may be in the form of a plurality of cross-hairs suitably spaced along the plate at locations corresponding to the spacing of the optical axes of the lenses. By way of example there may be seven lenses having optical axes spaced 3.25 inches apart giving an overall maximum dimension of 19.5 inches between the optical axes. As alignment of the optical axes is an important feature of the present invention the dimension tolerance for the marked lines should be on the order of $25 \times 10^{-6}$ inches. The adjustment means should be capable of aligning the optical axes to be substantially parallel in a first plane with a tolerance of 0.0005 inches. Similarly the optical axes should be substantially coplanar in a second plane orthogonal to the first plane with a tolerance of 0.0005 inches. Each of the lenses should have substantially the same focal length, the differential between the focal length of any two lenses should not exceed 0.1 mm, i.e., a tolerance of ±0.05 mm. Expressed in another manner each lens may be a 180 mm focal length. The image recorded on the film between any two lenses has a deviation in size which does not exceed 0.00052 mm per millimeter of image. If alignment is assisted by a ruler the environment should be controlled as to temperature, humidity and air quality in order to avoid distortion in the lenses, the ruler or the optical calibration.

A representative method of optically calibrating the axes of the lenses is by fixedly mounting the camera body 3 on a support. Mounted on the support is a microscope of suitable power, e.g., 30X. The microscope is mounted in a track which permits linear movement and the viewing optics face a film plate 67 at the rear of the camera body 3. The film plate 67 and the ruler each have reference markings to aid in positioning the ruler on the film plate. The side of the ruler having the optical axis markings is placed against the film plate 67. Using the microscope the reference markings on the ruler and film plate are aligned and the ruler is fixed in place. A point source of light is located at a distance in front of the lenses to coincide with the cross-hair spacing of the ruler and centered with respect to the plurality of lenses. The microscope is moved along the track and to each lens in order to determine whether the projected source of light coincides with the cross-hair on the ruler. Each of the lenses is then adjusted by the adjustment means to cause the optical axes to be substantially parallel and equidistant in a first plane and substantially coplanar in a second plane orthogonal to the first plane.

In a specific embodiment of the invention the lenses were f5.6–180 mm manufactured by Rodenstock having electronic shutters and flash synchronization. As shown in FIG. 5 the shutter 66 for each lens is located between the lens. Alternative shutter means are known to one skilled in the art, e.g., focal plane or behind the lens shutter.

In accordance with this invention, the optical axes of the lenses are substantially parallel in a first plane and substantially coplanar in an orthogonal plane, i.e., nonconverging. The field of view of one lens, e.g., the center lens of a group of seven lenses, is directed at the object to be photographed. The lenses adjacent to the right and left of the center lens have a progressively wider field of view of the same object. FIG. 4 shows a perspective view of the back of the camera with the film magazine 5 removed. The film from the magazine faces the film plate 67, the plate 67 having progressively wider openings 68 to 73 to the left and right of a reference line 81. The number of openings is equal to the number of lenses. If there is an odd number of lenses reference line 81 may pass through the middle of a center opening 74. If there is an even number of lenses reference line 81 may pass between two equally spaced groups of lenses. FIG. 9 shows in greater detail the film plate and the progressively wider openings 68 to 73 to the left and right of the center opening 74 where there are seven lenses. Respective pairs of openings, one on each side of the center opening 74 have equal widths. Openings pair 68 and 73 have the same width, as does openings pair 69 and 72 and openings pair 70 and 71. The width of each opening is progressively greater by approximately ten percent than the immediately adjacent opening. By way of example the center opening 74 may have a width of 2.250 inches and a height of 2.250 inches to accommodate the edges 75 and 76 of 70 mm film. Openings 68 to 73 each have a height of 2.250 inches. Opening pair 68 and 71 have a width of 2.510 inches; openings pair 69 and 72 have a width of 2.770 inches and openings pair 70 and 71 have a width of 3.030 inches. These dimensions apply to a 180 mm lens.

In use the recorded image on the film for a given focal length of each lens results in a field of interest for further processing which is less than the width of the openings 68 to 73. The field of interest for the height is equal to the height of the respective openings as the distance between the object and the film plane for each lens does not vary in a vertical plane. In the center opening 74 the full width and height of the opening comprises the field of interest. The height and width of the field of interest is preferably and substantially the same for each recorded image. The field of interest for each opening is shown in FIG. 9 as being within the width bounded by the lines 77 and 78. Openings 68 to 70 show the field of interest when the lenses are focused at infinity. Openings 71 to 73 show the field of interest when the lenses are focused at eight feet. A projection of the optical axis 25 of each lens 18 is shown relative to each field of interest for each opening at the indicated focus. The intersection of vertical lines 79 and horizontal line 80 is the center of each field of interest for each opening at the indicated focus.

As disclosed herein, the number of lenses may be at least two and preferably more. In the disclosed embodiment there are seven lenses. The number of lenses can be an even or odd number recognizing the interrelationship of the spacing between the lens optical axes, the focal length of the lenses and the distance between the camera and the subject to be photographed. If the optical axes are considerably spaced then the subject must be placed at a distance from the camera which will permit the outermost lenses to view the subject. Since the optical axes of the lenses are parallel if the subject is too close to the camera the viewing angle between the subject and the lens may exceed the capability of the lens. Ordinarily the spacing between the optical axes, the number of lenses and the focal length is fixed, the only variable being the subject to camera distance. As disclosed herein for seven lenses having a focal length of 180 mm and an optical axis spacing of 3.25 inches, the subject to camera distance should be eight feet or greater. It is more convenient, however, if the number of camera lenses is an odd number. The optical axis of the center lens can then be in the vertical plane passing through the viewing axis of the single lens reflex means 2 thereby facilitating the photographic operation.

Tolerances and dimensions recited herein are optimum values and deviation of as much as ten times can be acceptable depending on, for example, the size of enlargment of the film image, viewing distance of the stereogram and personal viewing preferences based on physiological factors.

The camera disclosed and claimed herein may be used in the apparatus and method according to application Ser. No. 864,748 filed concurrently herewith and assigned to the same assignee as the present application. The entire disclosure and description of application Ser. No. 864,748 is incorporated by reference. Application Ser. No. 864,748 discloses an apparatus and method of producing a parallax stereogram, i.e., free vision stereogram. The images on a film strip are optically viewed to establish homologous points for each film frame image. Each film frame is marked on an optical bench in accordance with the homologous points. The marked film frames are thereafter registered within a projection printing assembly comprising an enlarger and a line grid according to concurrently filed application Ser. No. 864,759 the entire contents which are incorporated by reference. Each film frame is exposed onto photosensitive material and the material is developed in the usual manner. A lenticular screen is superimposed over the developed picture to form the stereoscopic photograph.

Various modifications and improvements may be made by one skilled in the art to the apparatus disclosed herein without departing from the scope of the invention as defined by the claims.

What is claimed is:

1. A camera comprising
   at least two objective lenses, each lens having an optical axis,
   means for adjusting the optical axis of each lens so that the axes are substantially parallel in a first plane and substantially coplanar in a second plane orthogonal to the first plane, and
   a film plate having a plurality of openings corresponding to the number of lenses, the openings to the left and right of a reference line being progressively wider.

2. A camera according to claim 1 wherein each lens is independently adjustable in both planes.

3. A camera according to claim 1 wherein there are at least three lenses, the optical axes of any adjacent pair of lenses being spaced substantially equidistant from each other and substantially equal to the distance between any other adjacent pair of lenses.

4. A camera according to claim 1 wherein each lens has a given focal length, the differential between the focal length of any two lenses does not exceed 0.1 mm.

5. A camera according to claim 1 wherein each lens has a given focal length and wherein an image recorded on a film between any two lenses has a deviation in size which does not exceed 0.00052 mm per millimeter of image.

6. A camera according to claim 1 wherein there are seven lenses.

7. A camera according to claim 1 wherein the lenses are mounted in a common structure.

8. A camera according to claim 7 wherein releaseably attached to said structure is a film magazine, said magazine including means for advancing the film in increments of frames equal to the number of objective lenses.

9. A camera according to claim 1 wherein each lens has a shutter means and means for actuating each shutter means simultaneously and instantaneously.

10. A camera according to claim 1 comprising means for leveling the lenses in vertical and horizontal planes.

11. A camera according to claim 1 wherein each lens has an aperture control means and means for actuating each aperture control means simultaneously.

12. A camera according to claim 1 wherein each lens has a focus control means and means for actuating each focus control means simultaneously.

13. A camera according to claim 1 comprising a single lens reflex viewing means which is independent of the objective lenses.

14. A camera according to claim 1 wherein the reference line passes through the optical axis of a center opening for a center lens.

15. A camera according to claim 1 wherein the width of each opening is progressively greater by approximately ten percent than the immediately adjacent opening.

16. A camera according to claim 1 wherein the height of each of the openings is equal.

17. A camera according to claim 1 wherein there are an equal number of lenses on either side of the reference line.

18. A camera according to claim 1 wherein the reference line is located between adjacent openings.

19. A camera comprising:
   at least two objective lenses, each lens having an optical axis, and
   a film plate having a plurality of openings corresponding to the number of objective lenses, the openings to the left or right of a given reference being progressively wider.

20. A camera according to claim 19 wherein the given reference passes through the optical axis of a center opening for a center lens.

21. A camera according to claim 19 wherein the width of each opening is progressively greater by approximately ten percent than the immediately adjacent opening.

22. A camera according to claim 19 wherein there are an equal number of lenses on either side of the given reference.

23. A camera according to claim 19 wherein the height of each of the openings is equal.

24. A camera according to claim 19 wherein the given reference line is located between adjacent openings.

25. An apparatus having a plurality of means for causing an image to be provided to a defined location on a photosensitive means through means disposed between the photosensitive means and the imaging means, the disposed means comprising a plurality of spaced image transmitters having their centers in a first plane, the image transmitters being symmetrically disposed about a second plane orthogonal to the first plane and the width of the transmitters measured in the first plane increasing with the distance of the transmitters from the second plane.

26. An apparatus according to claim 25 wherein the image transmitters have a rectangular cross-section.

27. An apparatus according to claim 25 wherein the height of each of the image transmitters is equal.

28. An apparatus according to claim 25 wherein the width of each image transmitter is progressively greater by approximately ten percent than the immediately adjacent image transmitter.

29. An apparatus according to claim 25 wherein the second plane intersects the first plane at a location between adjacent image transmitters.

30. An apparatus according to claim 25 wherein the second plane intersects the first plane at a location passing through the center of the image transmitter.

* * * * *